United States Patent [19]

Takahashi et al.

[11] Patent Number: 5,525,409
[45] Date of Patent: Jun. 11, 1996

[54] NONWOVEN POLYESTER FABRIC

[75] Inventors: Takeshi Takahashi; Shigenori Terazono; Ryosuke Kamei, all of Kawasaki; Eiichiro Takiyama, Kamakura, all of Japan

[73] Assignee: Showa Highpoymer Co., Ltd., Tokyo, Japan

[21] Appl. No.: 447,633

[22] Filed: May 23, 1995

Related U.S. Application Data

[63] Continuation of Ser. No. 48,195, Apr. 20, 1993, abandoned.

[30]  Foreign Application Priority Data

May 13, 1992 [JP] Japan ..................... 4-120782

[51] Int. Cl.$^6$ ................ D04H 1/00; D04H 3/00
[52] U.S. Cl. ............ 428/224; 525/440; 528/272; 528/502
[58] Field of Search ............ 428/224; 525/440; 528/502, 272

[56]  References Cited

U.S. PATENT DOCUMENTS 2,999,851  9/1961  Elmer .
4,076,798  2/1978  Casey et al. .
4,166,873  9/1979  Gilliam .
5,306,787  4/1994  Takiyama ................ 525/440

FOREIGN PATENT DOCUMENTS 0323700  7/1989  European Pat. Off. .
0393819  10/1990  European Pat. Off. .
869243  1/1942  France .
1059075  3/1954  France .
1224858  6/1960  France .
4119455  9/1992  Germany .
748872  5/1956  United Kingdom .

*Primary Examiner*—Patricia A. Short
*Attorney, Agent, or Firm*—Sughrue, Mion, Zinn, Macpeak & Seas

[57] ABSTRACT

Nonwoven fabrics made of an aliphatic polyester having a melt viscosity of $5.0 \times 10^2$–$2 \times 10^4$ poises at a temperature of 190° C. at a shear rate of 100 sec$^{-1}$ and a melting point of 70°–190° C. The nonwoven fabric has biodegradability when it is buried in the ground and it is also excellent in tensile strength and tear propagation strength. Thus, the nonwoven fabric of the present invention is useful for sanitary materials, medical materials, packaging materials, agricultural covering materials, filters, oil absorption materials, materials for a daily life, padding cloth materials for clothes, cell separators, drain sheets for constructions and the like.

11 Claims, No Drawings

NONWOVEN POLYESTER FABRIC

This is a Continuation of application Ser. No. 08/048,195 filed Apr. 20, 1993, now abandoned.

BACKGROUND OF THE INVENTION

1. Field of the Invention

The present invention relates to nonwoven fabric having excellent heat stability and mechanical strength which are prepared by using aliphatic polyesters with biodegradability and sufficiently high molecular weights and specific melt properties for practical use.

2. Discussion of the Background

In recent years, industrial filter fabric, wall materials and interior materials continue to become plasticized, and on the other hand, it is possible for the resulting waste from the large amounts of plastics used in these materials to pollute rivers, oceans and soil. This is becoming a serious social problem. To prevent such pollution the development of biodegradable plastics has been desired; for example, poly(3-hydroxybutylate) produced by fermentation methods using microorganisms, blends of general-purpose plastics and starch, a naturally occurring polymer, and the like are already known. The former polymer has a drawback in that it is poor in molding properties because the polymer has a heat decomposition temperature close to its melting point and a raw material efficiency is very bad because it is produced by microorganisms. On the other hand, since the naturally occurring polymer of the latter does not by itself have thermoplasticity, the polymer has defects in molding properties, and is greatly limited in its range of application.

On the other hand, although it is known that aliphatic polyesters are biodegradable, they have hardly been used because polymeric material sufficient enough to obtain practical molded product cannot be obtained. Recently, it has been found that a ring-opening polymerization of ε-caprolactone produces a higher molecular weight polymer, and proposed to use the polymer as a biodegradable resin. However, the resulting polymer is limited to only special applications because of a low melting point of 62° C. and a high cost thereof. Further, although glycolic acid, lactic acid and the like are polymerized by a ring-opening polymerization of glycolide and lactide thereof to obtain polymers with higher molecular weights so as to be sometimes used as medical fibers and the like, the polymers are not used in great amounts as industrial filter fabric, wall materials, interior materials and the like because their decomposition temperatures are close to their melting point and they have defects in their molding properties.

It is no exaggeration to say that high molecular weight polyesters (referring to polyesters having number-average molecular weights of at least 10,000) generally used for forming nonwoven fabrics which are used in industrial filter fabric, wall materials and interior materials are limited to polyethylene terephthalete, a condensate of terephthalic acid (including dimethyl terephthalate) and ethylene glycol. Although there are cases of 2,6-naphthalenedicarboxylic acid being used instead of terephthalic acid, there are no reports of trials which obtained polymers with biodegradability.

Therefore, it is safe to say that there has been no concept of trying to make the fabric in practical use by forming using biodegradable aliphatic polyesters in which aliphatic dicarboxylic acid was used.

One of the reasons why this application concept has not been thought of is felt to be that in spite of the required special forming conditions and physical properties for the above nonwoven fabrics, most of the above-mentioned aliphatic polyesters have melting points of 100° C. or lower even if they are crystalline, and have poor heat stability when melted above that. Of further importance is that the properties, particularly mechanical properties such as tensile strength, of these aliphatic polyesters show markedly poor values even when they are the same level of number-average molecular weight as the above-mentioned polyethylene terephthalete, so just conceiving that the molded articles having required strength and the like would be obtained was difficult.

Another reason seems to be that studies for improving the physical properties of the aliphatic polyesters by increasing their number-average molecular weights have not been sufficiently advanced because of their poor heat stability.

The object of the present invention is to provide nonwoven fabrics prepared by using the above-mentioned aliphatic polyesters as their components which have sufficient high molecular weights for practical use, and excellent mechanical properties represented by heat stability and tensile strength, and which can be decomposed by microorganisms and the like, i.e., are biodegradable as one means of waste disposal so that they may be easily disposed of after the use thereof.

SUMMARY OF THE INVENTION

As a result of various studies of the reaction conditions for obtaining polyesters having sufficient high molecular weight for practical use and molding properties suitable for nonwoven fabrics, the present inventors have obtained specific aliphatic polyesters that maintain biodegradability while having sufficient high molecular weights for practical use, then have found that nonwoven fabrics prepared from the polyesters have excellent tensile strength, tear propagation strength and flexibility as well as the above-mentioned biodegradability to achieve the present invention.

More specifically, the present invention provides (A) a nonwoven fabric using fibers mainly composed of aliphatic polyester having a melt viscosity of $5.0 \times 10^2$–$2.0 \times 10^4$ poise at a temperature of 190° C. at a shear rate of 100 $\text{sec}^{-1}$ and a melting point of 70°–190° C.; (B) a nonwoven fabric according to (A) including 0.03–3.0% urethane bonds by weight, the number-average molecular weight of the aliphatic polyester being at least 10,000; (C) a nonwoven fabric according to (A) or (B) consisting of aliphatic polyester obtained by reacting 0.1–5 parts by weight of diisocyanate with 100 parts by weight of aliphatic polyester prepolymer having a number-average molecular weight of 5,000 or higher and a melting point of at least 60° C. or higher; and (D) a nonwoven fabric according to (A), (B), or (C) having tensile strength of 10 g/5 cm width/g/m² or greater and tear propagation strength of 5 g/g/m² or greater.

DETAILED DESCRIPTION OF THE INVENTION

The present invention will be described below in further detail.

The aliphatic polyester of the present invention mainly consists of a polyester obtained by reacting two components of glycols and dicarboxylic acid (or acid anhydrides thereof), and if necessary as a third component, with at least one polyfunctional component selected from the group consisting of trifunctional or tetrafunctional polyols, oxycarboxylic acids, and polybasic carboxylic acids (or acid anhydrides thereof). The aliphatic polyesters are prepared by reacting relatively high molecular weight polyester prepolymers which have hydroxyl groups at ends with a coupling agent so as to make them even higher molecular weight polymer.

It has been known to obtain polyurethane by reacting a low molecular weight polyester prepolymer having a number-average molecular weight of 2,000–2,500, which have hydroxyl groups as the terminal groups, with diisocyanate as a coupling agent in the preparation of rubbers, foams, coatings and adhesives.

However, the polyester prepolymers used in these polyurethane foams, coatings and adhesives are prepolymers having a low molecular weight and a number-average molecular weight of 2,000–2,500 which is the maximum that can be prepared by non-catalytic reaction. To obtain practical physical properties as the polyurethane, it is necessary that the content of diisocyanate should be as much as 10–20 parts by weight in relation to 100 parts by weight of this low molecular weight prepolymer. When such a large amount of diisocyanate is added to the low molecular weight polyester melted at 150° C. or higher, gelation occurs so that no normal resins which can be molded in the form of a melt can be obtained.

Therefore, polyesters which are obtained by reacting a large amount of diisocyanate with a low molecular weight polyester prepolymers as a raw material cannot be used as the plastic raw material for the nonwoven fabrics of the present invention.

Also, as shown in the case of polyurethane rubbers, although a method is conceivable in which hydroxyl groups are converted into isocyanate groups by the addition of diisocyanate, and then the number-average molecular weight thereof is further increased by using glycols, the same problem as mentioned above arises because 10 parts by weight of diisocyanate relative to 100 parts by weight of the prepolymer should be used in order to obtain practical physical properties.

When a relatively high molecular weight polyester prepolymer is to be used, heavy metal catalysts required to prepare the prepolymer would promote the reactivity of the above-mentioned isocyanate groups to undesirably cause poor preservativity, generation of crosslinking and branching; hence a number-average molecular weight of not more than around 2,500 of polyester prepolymers would be the limit if they were to be prepared without catalysts.

The polyester prepolymers to obtain the aliphatic polyesters used in the present invention are relatively high molecular weight saturated aliphatic polyesters having substantially hydroxyl groups at the ends thereof, number-average molecular weights of at least 5,000, preferably at least 10,000, and melting point of 60° C. or higher, which are obtained by reacting glycols and dibasic carboxylic acids (or acid anhydrides thereof) in the presence of catalysts. When a prepolymer having a number-average molecular weight of lower than 5,000 is used, the small amounts of 0.1–5 parts by weight of coupling agents used in the present invention cannot provide polyesters for blow-molding having good physical properties. When polyester prepolymers having number-average molecular weights of 5,000 or higher are used, with hydroxyl values of 30 or less, the use of small amounts of coupling agents even under severe conditions such as a molten state and the like can produce high molecular weight polyesters without gelation as the reaction is not affected by remaining catalyst.

Therefore, the polymer for the nonwoven fabrics of the present invention has a repeated chain structure in which a polyester prepolymer having a number-average molecular weight of 5,000 or more, preferably 10,000 or more and consisting of an aliphatic glycol and aliphatic dicarboxylic acid is combined through the urethane bonds derived from, for example, diisocyanate as a coupling agent.

Further, the polymer for the nonwoven fabrics of the present invention has a repeated chain structure in which the above-mentioned polyester prepolymer provided with branched long chains derived from polyfunctional components is combined through the urethane bonds derived from, for example, diisocyanate as a coupling agent. When oxazoline, epoxy compounds, and acid anhydrides are used as a coupling agent, the polyester prepolymer has a repeated chain structure through ester bonds.

The nonwoven fabrics of the present invention consisting of an aliphatic polyester having a melt viscosity of $5.0 \times 10^2$–$2.0 \times 10^4$ poises at a temperature of 190° C. at a shear rate of 100 sec$^{-1}$ and a melting point of 70°–190° C., particularly the nonwoven fabrics of the present invention which consists of an aliphatic polyester obtained by reacting 0.1–5 parts by weight of diisocyanate with 100 parts by weight of an aliphatic polyester prepolymer having a number-average molecular weight of 5,000 or higher and a melting point of 60° C. or higher has biodegradability when buried in the earth; generates lower heat of combustion than polyethylene and polypropylene even when disposed into an incinerator; and has excellent in tensile strength and tear propagation strength. Therefore, it can be used for sanitary materials, medical materials, packaging materials, agricultural covering materials, filters, oil absorption materials, materials for daily life, padding cloth, cell separator, draining sheet for construction work and the like.

Examples of glycols which can be used as a reaction component include aliphatic glycols. Among them those having a straight chain alkylene group with even number carbon atoms of 2, 4, 6, 8 and 10 such as: ethylene glycol, 1,4-butanediol, 1,6-hexanediol, 1,8-octanediol, 1,10-decanediol, and mixtures thereof are preferable.

Of these glycols, those having a smaller number of carbon atoms, such as ethylene glycol, 1,4-butanediol and 1,6-hexanediol, are preferable because they can produce an aliphatic polyester having a high crystallinity and a high melting point. In particular, ethylene glycol and 1,4-butanediol are most suitable because they produce good results.

Examples of aliphatic dicarboxylic acids or anhydrides thereof which provide aliphatic polyester by reacting with glycols include aliphatic dicarboxylic acids. Among them those having a straight chain alkylene group with even number carbon atoms of 2, 4, 6, 8 and 10 such as: succinic acid, adipic acid, suberic acid, sebacic acid, 1,10-decanedicarboxylic acid, succinic anhydride and mixtures thereof are preferable. Of these dicarboxylic acids, those having a smaller number of carbon atoms, such as succinic acid, adipic acid and succinic anhydride, are preferable because they can produce an aliphatic polyester having high crystallinity and high melting points. In particular, succinic acid, succinic anhydride and an acid mixture of succinic acid or succinic anhydride and another dicarboxylic acid such as adipic acid, suberic acid, sebacic acid or 1,10-decanedicarboxylic acid are preferable.

In the system of an acid mixture containing two or more acid components, for example, succinic acid and other dicarboxylic acids, the mixing ratio of succinic acid is at least 70 mol %, preferably at least 90 mol %, and the mixing ratio of the other carboxylic acids is 30 mol % or less, preferably 10 mol % or less.

A combination of 1,4-butanediol and succinic acid or succinic anhydride and a combination of ethylene glycol and succinic acid or succinic anhydride are particularly preferable for the present invention because the combinations exhibit melting points close to that of polyethylene.

(Third component)

To these glycols and dicarboxylic acid, if necessary, may be added as a third component at least one polyfunctional component selected from the group consisting of trifunctional or tetrafunctional polyols, oxycarboxylic acid, and polybasic carboxylic acids (or acid anhydrides thereof). The addition of this third component, which causes the branching of long chains, can impart desirable properties in molten state to the polyester prepolymer, because the ratio of weight-average molecular weight (MW)/number-average molecular weight (Mn), i.e., the molecular weight distribution, increases with increases in its molecular weight.

In terms of the amount of polyfunctional components to be added without fear of gelation, a trifunctional component of 0.1–5 mole %, or a tetrafunctional component of 0.1–3 mole % is added relative to 100 mole % of the total of aliphatic dicarboxylic acid (or acid anhydride thereof) components.

(Polyfunctional components)

Examples of polyfunctional components as the third component include trifunctional or tetrafunctional polyols, oxycarboxylic acids, and polybasic-carboxylic acids.

The trifunctional polyols representatively include trimethylol propane, glycerin or anhydrides thereof. The tetrafunctional polyols representatively include pentaerythritol.

The trifunctional oxycarboxylic acid components are divided into the two types of (i) a component which has two carboxyl groups and one hydroxyl group in one molecule, and (ii) another component which has one carboxyl group and two hydroxyl groups in one molecule. Malic acid which has two carboxyl groups and one hydroxyl group in one molecule becomes practical and sufficient to the purposes of the present invention in view of commercial availability at low cost.

The tetrafunctional oxycarboxylic acid components are the following three types of components:

(i) A component which has three carboxyl groups and one hydroxyl group in one molecule;

(ii) Another component which has two carboxyl groups and two hydroxyl group in one molecule; and (iii) The remaining component which has three hydroxyl groups and one carboxyl group in one molecule. Any type can be used, though in view of commercial availability at low cost, citric acid and tartaric acid are practical and sufficient to the purposes of the present invention.

As a trifunctional polybasic carboxylic acid (or acid anhydride thereof) component trimesic acid, propane tricarboxylic acid and the like can be used. Among them, trimesic anhydride is practical for the purposes of the present invention.

As a tetrafunctional polybasic carboxylic acid (or anhydride thereof) various types of aliphatic compounds, cycloaliphatic compounds, aromatic compounds and the like, described in certain literatures, can be used. In view of commercial availability, for example, pyromellitic anhydride, benzophenone tetracarboxylic anhydride and cyclopentane tetracarboxylic anhydride are practical and sufficient to the purposes of the present invention.

These glycols and dibasic acids are mainly consisted of aliphatic series, while small amounts of other components, for example, aromatic series may be concomitantly used. These other components may be blended or copolymerized in amounts up to 20% by weight, preferably up to 10% by weight, and more preferably up to 5% by weight because using these compounds degrades biodegradability.

The polyester prepolymer for aliphatic polyesters to be used in the present invention has hydroxyl groups at the terminals. To introduce the hydroxyl groups, it is necessary that glycols are used somewhat excessively.

For preparation of the polyester prepolymer having a relatively high molecular weight, it is necessary to use deglycol-reaction catalysts in the deglycol reaction subsequent to the esterification. Examples of the deglycol-reaction catalysts include titanium compounds such as acetoacetoyl type titanium chelate compounds and organic alkoxy titanium compounds and the like. These titanium compounds can be used in combination. Examples of compounds used in combination include diacetoacetoxy oxytitanium (Nippon Chemical Industry Co., Ltd.; Nursem Titanium) tetraethoxy titanium, tetrapropoxy titanium, tetrabutoxy titanium and the like. The amount of the titanium compound used is 0.001–1 part by weight, and preferably 0.01–0.1 part by weight relative to 100 parts by weight of the polyester prepolymer. These titanium compounds may be blended before the esterification, or may be blended immediately before the deglycol-reaction.

To the polyester prepolymer which has a number-average molecular weight of at least 5,000, preferably at least 10,000, and whose terminal groups are substantially hydroxyl groups are added coupling agents in order to increase its number-average molecular weight.

Examples of the coupling agents include diisocyanate, oxazoline, diepoxy compounds, acid anhydrides and the like. Diisocyanate is particularly preferred.

In the cases of oxazoline and diepoxy compounds, it is necessary that the terminal hydroxyl groups are reacted with acid anhydrides and the like to convert them into carboxyl groups, then coupling agents are used.

Although not limited, examples of diisocyanate include 2,4-tolylene diisocyanate, a mixture of 2,4-tolylene diisocyanate and 2,6-tolylene diisocyanate, diphenylmethane diisocyanate, 1,5-naphthylene diisocyanate, xylylene diisocyanate, hydrogenated xylylene diisocyanate, hexamethylene diisocyanate, isophorone diisocyanate and the like. Particularly, hexamethylene diisocyanate is preferably used in terms of hue of prepared resins, reactivity at the time of blending polyesters, and the like.

The adding amounts of these coupling agents are 0.1–5 parts by weight, and preferably 0.5–3 parts by weight relative to 100 parts by weight of polyester prepolymer. Addition of less than 0.1 part by weight causes insufficient coupling reaction, whereas with more than 5 parts by weight gelation tends to occur.

The addition is preferably performed when the polyester is in a uniformly melted state under easily stirrable conditions. Although it is not impossible for the coupling agents to be added to the polyester prepolymer in the solid state and melted and mixed through an extruder, adding the agents in a polyester preparation unit, or adding them to polyester prepolymer in a melt state (for example, in a kneader) is more practical.

The aliphatic polyester to be employed in the present invention is required to have specific melt properties in order to be made into non-woven fabric by spinning. That is, the aliphatic polyester to be employed in the present invention needs to have a melt viscosity of $5.0\times10^2$–$2.0\times10^4$ poise, preferably $3.0\times10^3$–$1.2\times10^4$ poises, and more preferably $4.0\times10^3$–$8.0\times10^3$ at a temperature of 190° C. at a shear rate of $100\,\text{sec}^{-1}$.

A melt viscosity of less than $5.0\times10^2$ causes vibration of the strand to swing greatly during melt extrusion and therefore makes stable wind up difficult, which further results in inadequate physical properties even though wind up is achieved. On the other hand, a melt viscosity of more than $2.0\times10^4$ cannot achieve strand fineness during melt extrusion, and makes it difficult to stretch, or only allows a strand having a low percentage of stretch to be obtained.

The melt viscosity at a shear rate of $100\,\text{sec}^{-1}$ was calculated from a graph which shows the relationship between the apparent viscosities and the shear rates measured by a capillary rheometer using a nozzle having a diameter of 1.0 mm and L/D of 10 at a resin temperature of 190° C.

The melting point of the aliphatic polyester to be used in the present invention needs to be 70°–190° C. preferably 70°–150° C., and more preferably 80°–135° C. A melting point lower than 70° C. will give the fabrics poor heat resistance to distort them, whereas with higher than 190° C. it is difficult to carry out forming.

To achieve a melting point higher than 70° C. the polyester prepolymer need to have a melt temperature of at least 60° C.

When urethane bonds are contained in the aliphatic polyester to be used in the present invention, the amount of urethane bonds is 0.03–3.0% by weight, preferably 0.05–2.0% by weight, and more preferably 0.1–1.0% by weight.

The amount of urethane bonds is measured by $^{13}$C NMR, showing good correlation with the charged amount.

Less than 0.03% by weight of urethane bonds has a little effect on polymerization and leads to poor molding properties, whereas more than 3% by weight causes gelation.

It is needless to say that when the above-mentioned aliphatic polyester is used to obtain the nonwoven fabrics according to the present invention, if necessary, lubricants, waxes, coloring agents and crystallizing promoters as well as antioxidants, thermal stabilizers, UV absorbers and the like can be used concomitantly. Further, a small amount of another kind of fiber may be used to reinforce the nonwoven fabric.

That is, antioxidants include hindered phenol antioxidants such as p-tert-butyl hydroxytoluene and p-tertbutyl hydroxyanisole, sulfur antioxidants such as distearyl thiodipropionate and dilauryl thiodipropionate, and the like; heat stabilizers include triphenyl phosphite, trilauryl phosphite, trisnonylphenyl phosphite and the like; UV absorbers include p-tert-butyl phenyl salicylate, 2-hydroxy-4-methoxybenzophenone, 2-hydroxy-4-methoxy-2'-carboxybenzophenone, 2,4,5-trihydroxybutylophenone and the like; lubricants include calcium stearate, zinc stearate, barium stearate, sodium palmirate and the like; antistatic agents include N,N-bis(hydroxyethyl)alkyl amine, alkyl amine, alkyl allyl sulfonate, alkyl sulfonate and the like; flame retarders include hexabromocyclododecane, tris-(2,3-dichloropropyl) phosphate, pentabromophenyl allyl ether and the like; inorganic fillers include calcium carbonate, silica, titanium oxide, talc, mica, barium sulfate, alumina and the like; crystallizing promoters include polyethylene terephthalate, poly-trans-cyclohexane dimethanol terephthalate and the like.

Although known methods of producing the nonwoven fabric may be employed, this may include a spinning process if necessary, that is next divided into a web forming process and a bonding process, with the forming processed basically classified into wet, dry and direct methods.

The wet method is for forming a web achieved by suspending a short fiber, which has already been spun, in water. The dry method includes an air-ray method and a card method. The direct method is a process of producing a web directly from fiber spun from melted resin. Such a method is further divided into a spunbond method and a meltblown method; these methods are employed whereby web-forming and bonding are performed at the same time. On the other hand, a thermal bond method and a chemical bond method are known as a method of bonding in a different process after web-forming. A spunlace method and a stitchbond method are also known.

It is possible to make a staple from the aliphatic fiber used in the present invention in the case of polyamide, polyolefine, polyurethane, polyester and the like, by employing a fiber spinning device. Further, nonwoven fabric can be made from the staple by a wet-and-dry method. On the other hand, nonwoven fabrics can be produced by conventional production methods such as spunbond, meltblown and the like.

It is possible to perform extrusion-spinning from the aliphatic polyester used as a main component in the present invention at an extrusion temperature of between 190°–250° C., and more preferably, at a temperature of between 190°–220° C. A low temperature increases extrusion torque and a high temperature makes gelation occur easily. The aliphatic polyester is desirably dried in a vacuum before use since it foams if it absorbs moisture.

Also, a surface treatment may be performed on a web while producing the nonwoven fabric or on the produced nonwoven fabric. Further, a piece of paper or cloth may also be stuck and bonded thereon The nonwoven fabric of the present invention is suitable for use in sanitary materials, medical materials, packaging materials, agricultural covering materials, filters, oil absorption materials, cell separators, padding cloth material for clothes, and other materials for daily life and the like, and is optimal for products having light weight.

EXAMPLES

The present invention will be illustrated with reference to the following Examples and Comparative Examples, but the invention is not intended to be limited only thereto.

Methods of measuring the characteristic values shown in the examples are as follows.

(1) Tensile strength of non-woven fabric

According to the method used in non-woven fabric padding cloth test JIS L1085, a sample having a width of 5 cm is measured at a holding distance of 10 cm and at a tensile speed of 30 cm/minute. Tensile strength at break (g) of the sample is divided by weight (g) per 1 m$^2$ and the values in the horizontal and vertical directions are further averaged.

(2) Tear propagation strength of non-woven fabric (g/g/m$^2$)

According to the method used in non-woven fabric padding cloth test JIS L]085, a value which is measured by employing a tear propagation strength C method (vendulum method) is divided by weight (g) per 1 m$^2$ of non-woven fabric. The resulting values (g) in the horizontal and vertical directions are further averaged.

(Example 1)

A 700 L reactor was purged with nitrogen, then 183 kg of 1,4-butanediol and 224 kg of succinic acid were charged in it. After the temperature was elevated under nitrogen stream, esterification by dehydration condensation was carried out for 3.5 hr at 192°–220° C., and after ceasing nitrogen charge, for further 3.5 hr under reduced pressures of 20-2 mmHg. A sample collected had an acid value of 9.2 mg/g, a number-average molecular weight (Mn) of 5,160 and a weight average molecular weight (Mw) of 10,670. Subsequently, 34 g of tetraisopropoxy titanium, a catalyst, was added at normal pressures under nitrogen stream. The temperature was elevated to carry out a deglycol-reaction at temperatures of 215°–220° C. under reduced pressures of 15–0.2 mmHg for 5.5 hr. A sample collected had a number-average molecular weight (Mn) of 16,800 and a weight average molecular weight (Mw) of 43,600. The yield of resulting polyester prepolymer (A1) was 339 kg except condensate water.

5.42 kg of hexamethylene diisocyanate was added to the reactor containing 339 kg of the polyester prepolymer (A1) to perform a coupling reaction for 1 hr at 180°–190° C. The viscosity was rapidly increased, but no gelation occurred. Then, 1.70 kg of Irganox 1010 (Ciba-Geigy) as an antioxidant and 1.70 kg of calcium stearate as a lubricant were added, and the mixture was further stirred for 30 min. The resulting reaction product was extruded into water, and cut by a cutter into pellets. The aliphatic polyester (B1) obtained after drying in a vacuum at 90° C. for 6 hr had a yield of 300 kg.

The obtained polyester (B1) was a slightly ivorylike white, waxy crystal, and had a melting point of 110° C., a number-average molecular weight (Mn) of 35,500 a weight-average molecular weight (Mw) of 170,000, a MFR (190° C.) of 1.0 g/10 min, a viscosity of 230 poises in a 10% ortho-chlorophenol solution and a melt viscosity of $1.5 \times 10^4$ poises at a temperature of 190° C. at a shear rate of 100 $sec^{-1}$. The average-molecular weight was measured by a Shodex GPC System-11 (Showa Denko, gel permeation chromatography) using a HFIPA solution containing 5 mmol $CF_3COONa$ (concentration of 0.1% by weight) as a medium. A calibration curve was drawn using a PMMA standard sample (Shodex Standard M-75, Showa Denko).

Spun-bond apparatus used in the Examples consisted of an extruder equipped with 65 mmφ cylinder and a die having a nozzle comprising 200 holes in 5 rows.

Filaments spun out from the die were drawn by air-jet suction to be charged statically, deposited on a moving conveyer to form web.

The thus formed web was pressed between a heat embossing roll (0.3 mm deep, contact area of 30%) and silicone rubber roll to make the nonwoven fabric.

Polyester (B1) was spun by extrusion at a cylinder and die temperature of 180°–190° C. at spinning rate of 3500 m/min to make 3 denier filament which was deposited to make nonwoven fabric of a weight of 50 g/m².

The result of evaluation of the fabric are shown in Table 1.

The resulting nonwoven fabric was extremely tough, exhibiting the values of 200 g/50 mm width/g/m² in tensile strength and 55 g/m² in tear propagation strength (shown in Table 1).

The nonwoven fabric was buried in the ground for 5 months, after which time it was no longer in the form of a nonwoven fabric.

(Example 2)

A nonwoven fabric having a weight of 70 g/m² was produced in substantially the same way as in Example 1.

The results of the values of 170 g/50 mm width/g/m² of the tensile strength and 75 g/m² of the tear propagation strength are shown in Table 1.

The nonwoven fabric was buried in the ground for 5 months after which time it had decomposed and changed to such a degree that it had no practical strength as a nonwoven fabric.

(Example 3)

A nonwoven fabric having a weight of 20 g/m² was produced in substantially the same way as in Example 1. The result is shown in Table 1.

(Example 4)

A 700 L reactor was purged with nitrogen, then 177 kg of 1,4-butanediol, 198 kg of succinic acid and 25 kg of adipic acid were charged in it. After the temperature was elevated under nitrogen stream, esterification by dehydration condensation was performed for 3.5 hr at 190°–210° C., and after ceasing nitrogen charge, for further 3.5 hr under reduced pressures of 20–2 mmHg. A sample collected had an acid value of 9.6 mg/g, a number-average molecular weight (Mn) of 6,100 and weight-average molecular weight (Mw) of 12,200. Subsequently, 20 g of tetraisopropoxy titanium, a catalyst, was added at normal pressures under nitrogen stream. The temperature was elevated to perform a deglycol-reaction at temperatures of 210°–220° C. under reduced pressures of 15–0.2 mmHg for 7.5 hr. A sample collected had a number-average molecular weight (Mn) of 17,300 and a weight-average molecular weight (Mw) of 46,400. The resulting polyester (A2) had a yield of 337 kg except condensate water.

4.66 kg of hexamethylene diisocyanate was added to the reactor containing 337 kg of polyester (A2) to perform a coupling reaction for 1 hr at 180°–200° C. The viscosity was rapidly increased, but no gelation occurred. Then, 1.70 kg of Irganox 1010 (Ciba-Geigy) as an antioxidant and 1.70 kg of calcium stearate as a lubricant were added, and the mixture was further stirred for 30 min. The resulting reaction product was extruded into water by an extruder, and cut by a cutter into pellets. The aliphatic polyester (B2) obtained after drying in a vacuum at 90° C. for 6 hr had a yield of 300 kg.

The obtained polyester (B2) was a slightly ivorylike white, waxy crystal, and had a melting point of 103° C., a number-average molecular weight (Mn) of 36,000, a weight-average molecular weight (Mw) of 200,900, a MFR (190° C.) of 0.52 g/10 min, a viscosity of 680 poises in a 10% orthochlorophenol solution and a melt viscosity of $2.2 \times 10^4$ poises at a temperature of 190° C. at a shear rate of 100 $sec^{-1}$.

Polyester (B2) was formed into a nonwoven fabric in substantially the same way as in Example 1. The resulting non-woven fabric having a weight of 50 g/m² obtained by extrusion molding in substantially the same way as in Example 7 was extremely tough, exhibiting the values of 150 g/50 mm width/g/m² in tensile strength and 50 g/m² in tear propagation strength.

The nonwoven fabric was buried in the ground for 5 months and it decomposed and changed to such a degree that it had no practical strength as a nonwoven fabric.

(Example 5)

A nonwoven fabric having a weight of 70g/m² was produced in substantially the same way as in Example 1. The results are shown in Table 1.

(Example 6)

A nonwoven fabric having a weight of 20g/m² was produced in substantially the same way as in Example 1. The result are shown in Table 1.

(Example 7)

A 700 L reactor was purged with nitrogen, then 145 kg of ethylene glycol, 251 kg of succinic acid and 4.1 kg of citric acid were charged in it. After the temperature was elevated under nitrogen stream, esterification by dehydration condensation was performed for 3.5 hr at 190°–210° C., and after ceasing nitrogen charge, for further 5.5 hr under reduced pressures of 20–2 mmHg. A sample collected had an acid value of 8.8 mg/g, a number-average molecular weight (Mn) of 6,800 and a weight-average molecular weight (Mw) of 13,500. Subsequently, 20 g of tetraisopropoxy titanium, a catalyst, was added at normal pressures under nitrogen stream. The temperature was elevated to perform a deglycol-reaction at temperatures of 210°–220° C. under reduced pressures of 15–0.2 mmHg for 4.5 hr. A sample collected had a number-average molecular weight (Mn) of 33,400 and a weight-average molecular weight (Mw) of 137,000. The resulting polyester (A3) had a yield of 323 kg except condensate water.

3.23 kg of hexamethylene diisocyanate was added to the reactor containing 323 kg of polyester (A3) to perform a coupling reaction for 1 hr at 180°–190° C. The viscosity was rapidly increased, but no gelation occurred. Then, 1.62 kg of Irganox 1010 (Ciba-Geigy) as an antioxidant and 1.62 kg of calcium stearate as a lubricant were added, and the mixture was further to stirred for 30 min. The resulting reaction product was extruded into water by an extruder, and cut by a cutter into pellets. The polyester (B3) obtained after drying in a vacuum at 90° C. for 6 hr had a yield of 300 kg.

The obtained polyester (B3) was a slightly ivory-like white, waxy crystal, and had a melting point of 96° C., a number-average molecular weight (Mn) of 54,000, a weight-average molecular weight (Mw) of 324,000, a MFR (190° C.) of 1.1 g/10 min, a viscosity of 96 poises in a 10% orthochlorophenol solution and a melt viscosity of $1.6 \times 10^4$ poises at a temperature of 190° C. at a shear rate of 100 sec$^{-1}$.

Polyester (B3) was formed into nonwoven fabric in substantially the same way as in Example 1. The resulting nonwoven fabric having a weight of 50 g/m² obtained by extrusion molding in substantially the same way as in Example 1 was extremely tough, exhibiting the values of 190 g/50 mm width/g/m² in tensile strength and 75 g/g/m² in tear propagation strength.

The nonwoven fabric was buried in the ground for 5 months and it decomposed and changed to such a degree that it had no practical strength as a non-woven fabric.

(Comparative Example 1)

Polyester (A1) was formed under substantially the same conditions as in Example 1. However, it tore during spinning, and thus the targeted web could not be obtained.

TABLE 1

| Example | Conditions of producing non-woven fabric | | Single yarn fineness (d) | Construction of non-woven fabric | | | Performance of non-woven fabric | |
|---|---|---|---|---|---|---|---|---|
| | Extrusion die temperature (°C.) | Roll temperature (°C.) | | Weight (g/m²) | Thickness (mm) | Density (g/cc) | Tensile strength (g/50 mm/g/m²) | Tear strength (g/g/m²) |
| 1 | 210 | 130 | 3 | 50 | 0.25 | 0.02 | 200 | 55 |
| 2 | 210 | 140 | 3 | 70 | 0.33 | 0.02 | 170 | 75 |
| 3 | 210 | 110 | 3 | 20 | 0.08 | 0.025 | 150 | 15 |
| 4 | 200 | 130 | 3 | 50 | 0.26 | 0.019 | 150 | 50 |
| 5 | 200 | 130 | 3 | 70 | 0.35 | 0.02 | 180 | 80 |
| 6 | 200 | 110 | 3 | 20 | 0.09 | 0.022 | 180 | 18 |
| 7 | 205 | 120 | 3 | 50 | 0.36 | 0.013 | 190 | 75 |

What is claimed is:

1. A nonwoven fabric comprising an aliphatic polyester having a melt viscosity of 3,000–16,000 poises at a temperature of 190° C. and a shear rate of 100 sec$^{-1}$, and having a melting point of 70°–190° C., wherein said aliphatic polyester is synthesized by using at least two components selected from the group consisting of aliphatic glycols, aliphatic dicarboxylic acids, trifunctional polyols, tetrafunctional polyols, oxycarboxylic acids, polybasic carboxylic acids and acid anhydrides thereof, wherein the components include a combination of (a) succinic acid or its anhydride and 1,4-butanediol, (b) succinic acid or its anhydride and adipic acid or its anhydride, and 1,4-butanediol, or (c) succinic acid or its anhydride and ethylene glycol;

wherein said aliphatic polyester is obtained by reacting 0.1–5 parts by weight of diisocyanate with 100 parts by weight of an aliphatic polyester prepolymer having a number-average molecular weight of at least 5,000 and a melting point of at least 60° C.;

wherein said nonwoven fabric is formed by subjecting said aliphatic polyester to spinning.

2. A nonwoven fabric as claimed in claim 1 wherein the aliphatic polyester has a number-average molecular weight of at least 10,000 and contains 0.03–3.0% by weight of urethane bonds.

3. A nonwoven fabric as claimed in claim 1 wherein the aliphatic polyester has a number-average molecular weight of at least 10,000 and contains 0.05–2.0% by weight of urethane bonds.

4. A nonwoven fabric as claimed in claim 1 wherein the aliphatic polyester has a number-average molecular weight of at least 10,000 and contains 0.1–1.0% by weight of urethane bonds.

5. A nonwoven fabric as claimed in any one of claims 2 to 4 consisting of an aliphatic polyester obtained by reacting 0.1–5 parts by weight of diisocyanate with 100 parts by weight of an aliphatic polyester prepolymer having a number-average molecular weight of at least 5,000 and a melting point of at least 60° C.

6. A nonwoven fabric as claimed in any one of claims 1 to 4 wherein tensile strength is at least 10 g/5 cm width/g/m$^2$ and tear propagation strength is at least 5 g/g/m$^2$.

7. A nonwoven fabric as in claimed in claim 1 or 2 wherein the aliphatic polyester has a repeated chain structure in which a polyester prepolymer having a number-average molecular weight (Mn) of 5,000 or more and consisting of an aliphatic glycol and aliphatic dicarboxylic acid, is combined through urethane bonds.

8. A nonwoven fabric as claimed in claim 1 or 2 wherein the aliphatic polyester has a repeated chain structure in which a polyester prepolymer having a number-average molecular weight (Mn) of 5,000 or more and obtained by reacting an aliphatic glycol, aliphatic dicarboxylic acid and, as the third component, at least one polyfunctional component selected from the group consisting of trifunctional or tetrafunctional polyols, oxycarboxylic acids and polybasic carboxylic acids or acid anhydrides thereof, is combined through a urethane bond.

9. A nonwoven fabric as claimed in claim 8 wherein the polyester prepolymer contains one or more compounds selected from the group consisting of trimethylol propane, glycerin and pentaerythritol as the trifunctional or tetrafunctional polyol of the third component.

10. A nonwoven fabric as claimed in claim 8 wherein the polyester prepolymer contains one or more compounds selected from the group consisting of malic acid, citric acid and tartaric acid as the trifunctional or tetrafunctional oxycarboxylic acid of the third component.

11. A nonwoven fabric as claimed in claim 8 wherein the polyester prepolymer contains one or more compounds selected from the group consisting of trimesic acid, propane tricarboxylic acid, trimellitic anhydride, pyromellitic anhydride, benzophenone tetracarboxylic anhydride and cyclopentane tetracarboxylic anhydride as the trifunctional or tetrafunctional polybasic carboxylic acid of the third component.

* * * * *